(12) United States Patent
Srinivasa et al.

(10) Patent No.: US 9,208,195 B2
(45) Date of Patent: Dec. 8, 2015

(54) RETRIEVING INFORMATION FROM A RELATIONAL DATABASE USING USER DEFINED FACETS IN A FACETED QUERY

(75) Inventors: Deepak M. Srinivasa, Bangalore (IN); Adarsh Ramamurthy, Karnataka (IN); Samanvitha Kumar, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 13/017,520

(22) Filed: Jan. 31, 2011

(65) Prior Publication Data

US 2012/0197849 A1    Aug. 2, 2012

(51) Int. Cl.
*G06F 17/30* (2006.01)

(52) U.S. Cl.
CPC .... *G06F 17/30427* (2013.01); *G06F 17/30522* (2013.01)

(58) Field of Classification Search
CPC .................. G06F 17/30427; G06F 17/30522
USPC ......................................................... 707/754
See application file for complete search history.

(56) References Cited

U.S. PATENT DOCUMENTS

| 6,442,566 | B1 * | 8/2002 | Atman et al. ................. 707/603 |
| 7,467,354 | B2 * | 12/2008 | Barry et al. ..................... 715/764 |
| 7,730,059 | B2 * | 6/2010 | Behnen et al. ................. 707/722 |
| 8,135,708 | B2 * | 3/2012 | Morton .......................... 707/728 |
| 8,195,695 | B2 * | 6/2012 | Cubranic ....................... 707/791 |
| 2002/0004764 | A1 * | 1/2002 | Stolze et al. ..................... 705/27 |
| 2004/0044661 | A1 * | 3/2004 | Allen et al. ........................ 707/3 |
| 2006/0294071 | A1 * | 12/2006 | Weare et al. ....................... 707/3 |
| 2007/0283259 | A1 * | 12/2007 | Barry et al. ..................... 715/700 |
| 2010/0049766 | A1 * | 2/2010 | Sweeney et al. .............. 707/737 |
| 2010/0114931 | A1 | 5/2010 | Xie et al. |
| 2010/0191718 | A1 * | 7/2010 | Coriell et al. .................. 707/714 |
| 2012/0203766 | A1 * | 8/2012 | Hornkvist et al. ............. 707/722 |

OTHER PUBLICATIONS

Maier, David, et al., "On the Foundations of the Universal Relation Model", ACM Transactions on Database Systems, vol. 9, No. 2, Jun. 1984, pp. 283-308.
Vardi, Moshe Y., "The Universal-Relation Data Model for Logical Independence", IEE Software, Mar. 1988, pp. 80-85.
Ross, Kenneth A., et al., "A Faceted Query Engine Applied to Archaeology", Proceedings of the 31st VLDB Conference, Trondheim, Norway, 2005.

(Continued)

*Primary Examiner* — James Trujillo
*Assistant Examiner* — Kurt Mueller
(74) *Attorney, Agent, or Firm* — Charles L. Moore; Moore & Van Allen PLLC

(57) ABSTRACT

A method, system and computer program product for retrieving information from a relational database using user defined facets in a faceted query may include receiving a faceted query and receiving at least one user defined facet group query. The method may also include filtering out facets in the faceted query that relate to metadata in the relational database. The method may additionally include associating each remaining facet in the faceted query with a corresponding user defined facet group query of the at least one user defined facet group query to provide a set of user defined facet groups. An SQL query may be generated for the faceted query using the set of user defined facet groups. Information from the relational database may be retrieved responsive to the SQL query.

14 Claims, 11 Drawing Sheets

(56) References Cited

OTHER PUBLICATIONS

Ben-Yitzhak, Ori, et al., "Beyond Basic Faceted Search", WSDM'08, Feb. 11-12, 2008, Palo Alto, California, USA, pp. 33-43.
Clarkson, Edward C., et al., "Generalized Formal Models for Faceted User Interfaces", JCDL'09, Jun. 15-19, 2009, Austin, Texas, USA, pp. 125-134.
Demidova, Elena, et al., "SUITS; Faceted User Interface for Constructing Structured Queries from Keywords", FP7 EU Project OKKAM (contract No. ICT-215032) and TENCompentence Integrated Project (contract No. 027087).
Elliott, Ame, "Flamenco Image Browser: Using Metadata to Improve Image Search Architectural design".
Maier, David, et al., "Windows on the World", 1983, pp. 68-78.
www.kimbly.com/blog/000239.html, Daily Abstraction, Why Faceted Navigation is Hard.
www.miskatonic.org/library/facet-web-howto.html, How to Make a Faceted Classification and Put it on the Web, 2009.

\* cited by examiner

FIG. 5

| FACET | VALUE | LINK |
|---|---|---|
|  |  |  |

FIG. 6

| FACET | VALUE | LINK |
|---|---|---|
| COLOR | BLACK | P1 |
| COLOR | BLACK | P6 |
| COLOR | BLACK | P7 |
| COLOR | GREEN | P1 |
| COLOR | GREEN | P6 |
| COLOR | GREEN | P7 |
| TV COLOR | SILVER | P2 |
| TV COLOR | GRAY | P2 |
| LAPTOP COLOR | BLACK | P5 |
| LAPTOP COLOR | WHITE | P5 |
| LAPTOP COLOR | GRAY | P5 |

_947_

| ATTRIBUTE_ID | LANGUAGE_ID | ATTRTYPE_ID | NAME | DESCRIPTION | CATENTRY_ID |
|---|---|---|---|---|---|
| 10003 | -1 | STRING | SHADE MATERIAL | THE MATERIAL OF THE LAMP SHADE, SUCH AS VELVET, MICA, OR LINEN. | 10031 |
| 10004 | -1 | STRING | BULB | THE NUMBER OF LIGHT BULBS AND THE MAXIMUM WATTAGE. | 10031 |
| 10005 | -1 | INTEGER | HEIGHT (INCHES) | THE VERTICAL HEIGHT, MEASURED FROM THE BOTTOM OF THE BASE TO THE TOP OF THE SHADE. | 10033 |
| 10036 | -1 | INTEGER | SERVING SIZE | THE DESIRED SERVING SIZE. | 10211 |
| 10037 | -1 | STRING | ASSORTMENT | THE DESIRED ASSORTMENT OF PLATES. | 10211 |
| 10036 | -1 | INTEGER | SERVING SIZE | THE DESIRED SERVING SIZE. | 10211 |
| 10001 | -6 | INTEGER | ALTURA (POLEGADAS) | A ALTURA VERTICAL, MEDIDA DA PARTE INFERIOR DA BASE ATÉ O TOPO DA CÚPULA. | 10031 |
| 10002 | -6 | INTEGER | LARGURA (POLEGADAS) | A LARGURA HORIZONTAL DA LUMINÁRIA, INCLUINDO A CÚPULA. | 10031 |

FIG. 9D

| ATTRVALUE_ID | LANGUAGE_ID | ATTRIBUTE_ID | ATTRTYPE_ID | STRINGVALUE | FLOATVALUE | INTEGERVALUE | CATENTRY_ID |
|---|---|---|---|---|---|---|---|
| 10003 | -1 | 10003 | STRING | MOCHA LINEN | | | 10031 |
| 10004 | -1 | 10004 | STRING | 1 X 60W | | | 10031 |
| 10005 | -1 | 10005 | INTEGER | | | 36 | 10031 |
| 10093 | -1 | 10093 | STRING | SALAD PLATE ONLY | | | 10065 |
| 10094 | -1 | 10094 | STRING | RED | | | 10065 |
| 10093 | -1 | 10093 | STRING | 5 PIECE SETTING | | | 10234 |
| 10016 | -6 | 10016 | STRING | VERDE MATA | | | 10232 |
| 10017 | -6 | 10017 | STRING | VERDE MATA | | | 10232 |

| FACET | VALUE | LINK |
|---|---|---|
| HEIGHT (INCHES) | 30 | 10031 |
| WIDTH (INCHES) | 18 | 10031 |
| AUTO-OFF | AUTO-OFF | 10157 |
| ESPRESSO | ESPRESSO | 10157 |
| COLOR OF TEACUPS | WHITE | 10209 |
| COLOR OF TEAPOT | WHITE | 10209 |
| COFFEECUP COLOR | WHITE | 10207 |
| COLOR OF TEACUPS | WHITE | 10209 |
| MICROWAVE SAFE? | YES | 10211 |
| DISHWASHER SAFE? | YES | 10211 |

| CATENTRY_ID | NAME |
|---|---|
| 10031 | MOCHA LINEN TABLE LAMP |
| 10731 | MOCHA LINEN TABLE LAMP |

FIG. 9G

RETRIEVING INFORMATION FROM A RELATIONAL DATABASE USING USER DEFINED FACETS IN A FACETED QUERY

BACKGROUND

Aspects of the present invention relate to relational databases and retrieving information from relational databases in response to a query, and more particularly to a method, system and computer program product for retrieving information from a relational database using user defined facets in a faceted query or faceted interface.

Relational databases still account for a vast majority of data storage systems used for enterprise applications. One approach to facilitate a non-technical user to interact with data from a relational database is to provide a faceted interface to the relational database. A Universal-Relation Data Model is an example of a technique for providing a faceted interface for a relational database. Basically, the Universal-Relation Data Model attributes are considered as facets and the values for those attributes are considered as facet values. A facet may be defined as a user selected attribute or column of an object table in a relational database. FIG. 4 includes an example of a relational database 400. In object table 402, "Customer," examples of facets may be "Customer.CID" and "Customer.CustomerName." The Universal-Relation Data Model works well when all of the metadata elements from a domain data model map into the metadata part or database schema of the relational database. However, forming and using a faceted interface become more complex when the metadata of the domain model cannot be fully mapped to the metadata of the relational database schema. Instead, some elements of the domain data model map into the data space of the relational database. For example, different elements in tables in the data model may have varying attributes and different values for each attribute. Having one single table for an element with all attributes may not be feasible because some attributes may not apply to all elements. Therefore, information about attributes and their values may need to be stored as data in relational tables in the relational database. An example of such a relational database is illustrated in FIG. 4 which illustrates different attribute tables in the relational database.

BRIEF SUMMARY

According to one aspect of the present invention, a method for retrieving information from a relational database using user defined facets in a faceted query may include receiving a faceted query and receiving at least one user defined facet group query. The method may also include filtering out facets in the faceted query that relate to metadata in the relational database. The method may additionally include associating each remaining facet in the faceted query with a corresponding user defined facet group query of the at least one user defined facet group query to provide a set of user defined facet groups. A structured query language (SQL) query may be generated for the faceted query using the set of user defined facet groups. Information from the relational database may be retrieved responsive to the SQL query.

According to another aspect of the present invention, a system for retrieving information from a relational database using user defined facets in a faceted query may include a processing device and a faceted query engine operable on the processing device. The faceted query engine may include a module for receiving a faceted query and a module for receiving at least one user defined facet group query. The faceted query engine may also include a module for filtering out facets in the faceted query that relate to metadata in the relational database. The faceted query engine may additionally include a module for associating each remaining facet in the faceted query with a corresponding user defined facet group query of the at least one user defined facet group query to provide a set of user defined facet groups. The faceted query engine may further include a module for generating an SQL query for the faceted query using the set of user defined facet groups and a module for retrieving the information from the relational database responsive to the SQL query.

According to a further aspect of the present invention, a computer program product for retrieving information from a relational database using user defined facets in a faceted query may include a computer readable storage medium having computer readable program code embodied therewith. The computer readable program code may include computer readable program code configured to receive a faceted query and computer readable program code configured to receive at least one user defined facet group query. The computer readable program code may also include computer readable program code configured to filter out facets in the faceted query that relate to metadata in the relational database. The computer readable program code may additionally include computer readable program code configured to associate each remaining facet in the faceted query with a corresponding user defined facet group query of the at least one user defined facet group query to provide a set of user defined facet groups. The computer readable program code may further include computer readable program code configured to generate an SQL query for the faceted query using the set of user defined facet groups and computer readable program code configured to retrieve the information from the relational database responsive to the SQL query.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 5 is an example of an output of a user defined facet group query in accordance with an embodiment of the present invention.

FIG. 6 is an example of results of a user defined facet group query applied to the relational database of FIG. 4.

FIGS. 9A-9G illustrate an example of retrieving information from a relational database using user defined facets in a faceted query in accordance with an embodiment of the present invention.

DETAILED DESCRIPTION

Figure 1:
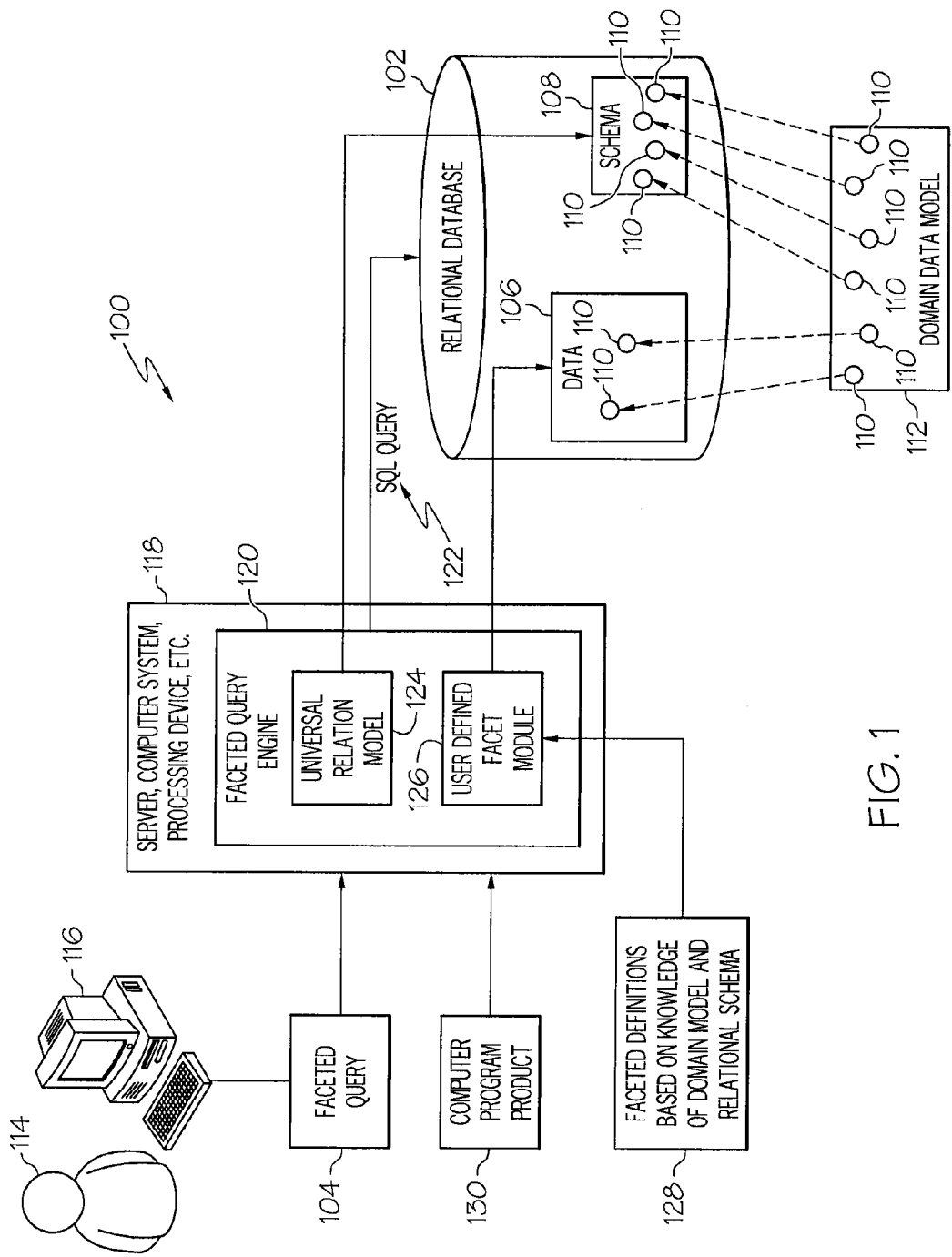
FIG. 1 is a block schematic diagram of an example of a system for retrieving information from a relational database using user defined facets in a faceted query in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
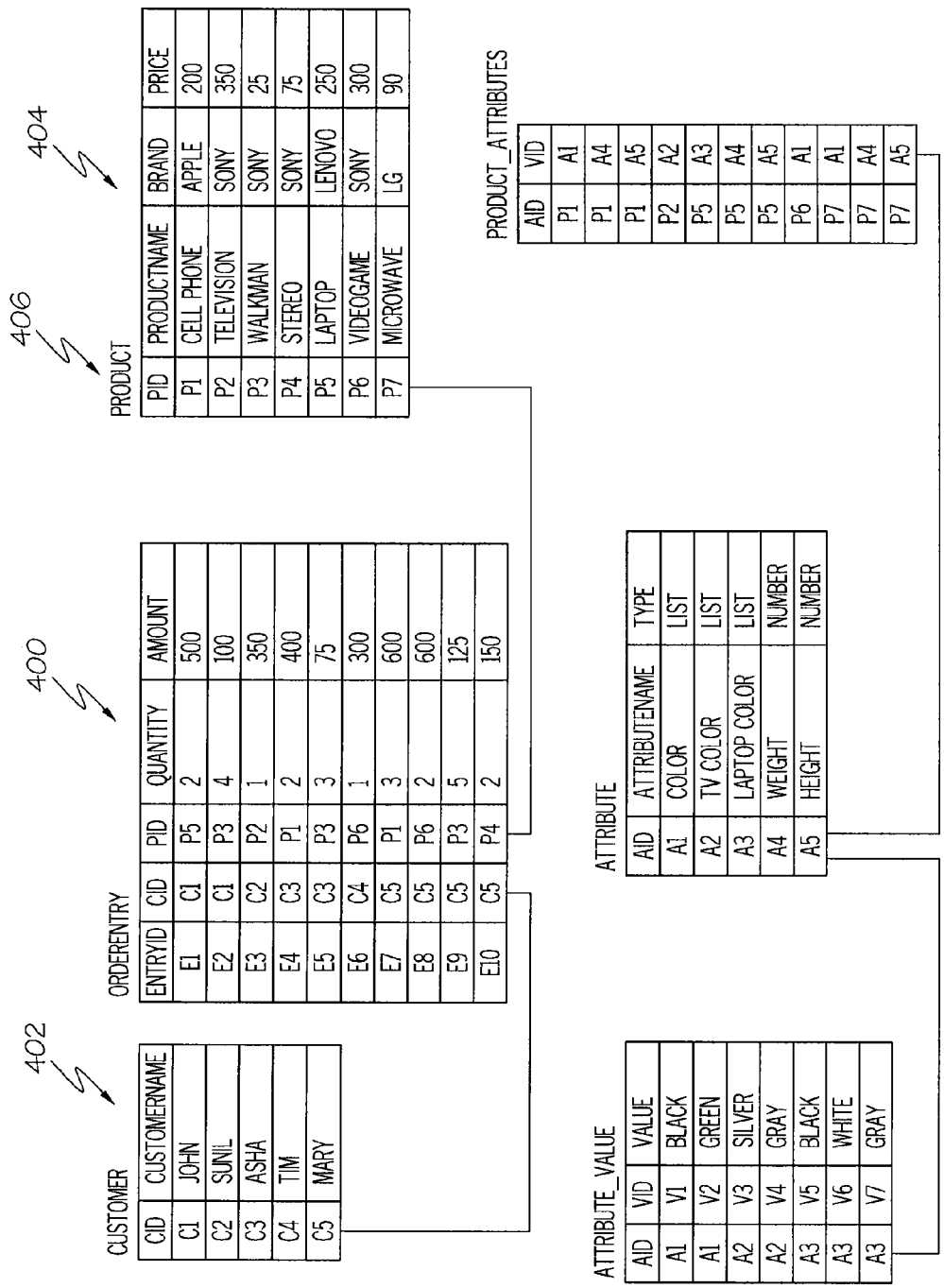
FIG. 4 is an example of a relational database for use in explaining exemplary features of the invention in accordance with an embodiment of the present invention.

FIG. 1 is a block schematic diagram of an example of a system 100 for retrieving information from a relational database 102 using user defined facets in a faceted query 104 in accordance with an embodiment of the present invention. The relational database 102 may include a data portion 106 or space and a schema portion 108 or metadata portion. Elements 110 or metadata elements from a domain data model 112 may map into both the data portion 106 or space of the relational database 102 and the schema portion 108 or metadata part of the relational database 102. An example of a relational database 400 including data elements mapped into both the data portion 106 and metadata portion or database schema portion 108 is illustrated in FIG. 4 and will be used to describe an example of a method of operation of the present invention.

A user 114, such as a non-technical business user, may submit the faceted query 104 from a client computer system 116 or computing device. The faceted query 104 may be received by a server 118. The server 118 may be or may include a computer system, processing device or similar device. A faceted query engine 120 may be operable on the server 108 to generate a structured query language (SQL) query 122 based on the faceted query 104 to retrieve the desired information or data from the relational database 102 responsive to the faceted query 104. The faceted query engine 120 may be a universal relation model based faceted query engine and may include a universal relation model module 124.

The faceted query engine 120 may also include a user defined facet module 126 or similar device. The user defined facet module 126 may link or map to elements 110 in the data portion 106 of the relational database 102. The universal relation model 124 of the faceted query engine 120 may link or map to elements 110 in schema portion 108 of the relational database 102.

Faceted definitions 128 based on knowledge of the domain data model 112 and the relational schema of the relational database 102 may be inputs to the user defined facet module 126. An example of creating or forming the faceted definitions 128 will be described with reference to FIG. 2. The user defined facet module may then form or create user defined facets or predefined facets that may be used in the faceted query 104 to form the SQL query 122 as described in more detail herein. The SQL query 122 may then retrieve the desired data or information from the relational database 102 that is responsive to the faceted query. The user defined facets or predefined facets allows formation of complex queries for retrieving data or information responsive to a faceted query when elements 110 from the data model 112 link or map to both the data portion 106 and metadata or schema portion 108 of the relational database 102.

The faceted query engine 120, universal relation model 124 and user defined facet module 126 may be loaded on the server 118 from one or more computer program products 130.

In accordance with another embodiment, the faceted query engine 120, universal relation model 124 and user defined facet module 126 may be loaded on and operable on the client computer system 116 or computing device. The faceted query 104 may be entered into the client computer system 116 by the user 114 by the computer system 116 presenting a graphical user interface (GUI), via a command line or by any other mechanism known in the computing arts.

Figure 2:
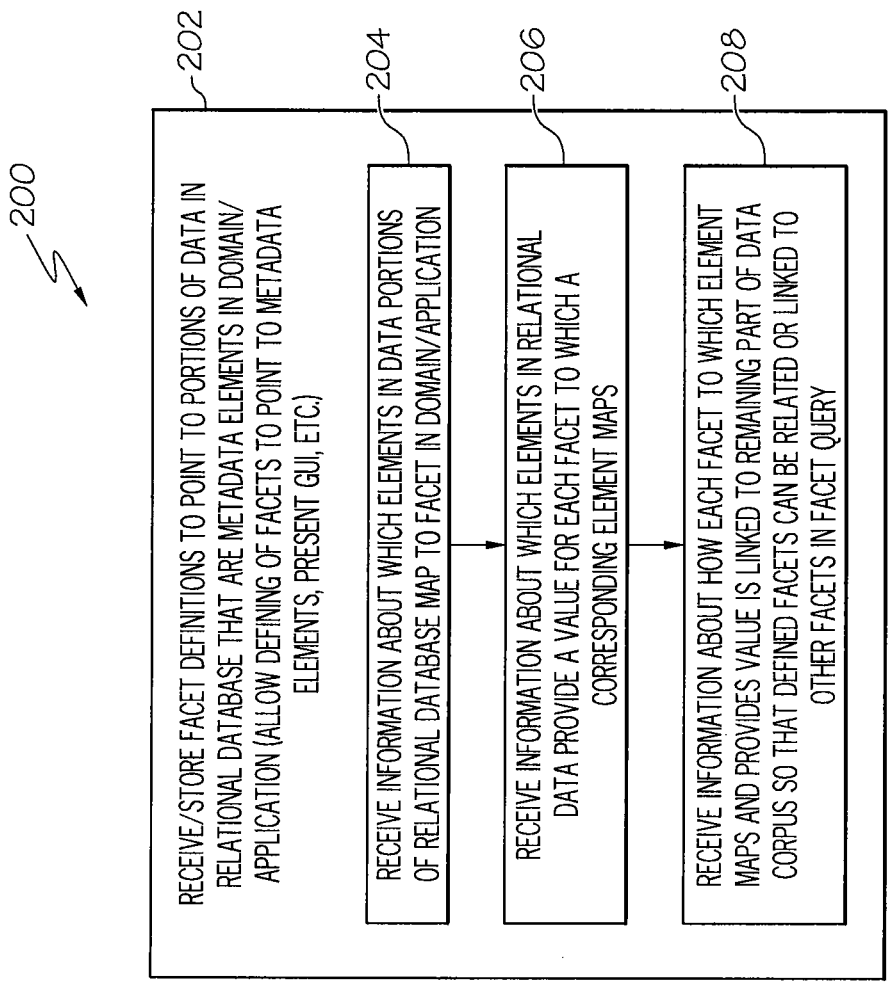
FIG. 2 is a flowchart of an example of a method to generate user defined facets or a faceted interface in accordance with an embodiment of the present invention.

FIG. 2 is a flowchart of an example of a method 200 to generate user defined facets, predefined facets or a faceted interface in accordance with an embodiment of the present invention. In block 202, facet definitions that point to portions of data in a relational database that correspond to metadata elements in a domain data model or application may be received and stored by a computer system or computing device. The defined facets or facet definitions may be received by a user defined facet module, such as user defined facet module 126 in FIG. 1, or a similar module. The facet definitions may be created or defined by a user or information technology (IT) user based on knowledge of the domain model and the relational database schema. A GUI or other mechanism may be presented to allow defining the facets to point to metadata elements in the relational database.

Blocks 204, 206 and 208 further illustrate details of the operations and information or data that may be used for creating the facet definitions within block 202. In block 204, information or data about which elements in the data portions of the relational database may map to which facets in a domain data model or application may be received or determined. The information or data may be received through a structured query language (SQL) query. A user defining the user defined facet may write an SQL query as per defined semantics. The SQL query may constitute information about which elements in the data portions of the relational database may map to which facets in the domain data model or application.

In block 206, information or data about which elements in the relational database provide a value for each facet to which a corresponding element maps may be received or determined. This information may also be provided by writing an SQL query. In block 208, information or data is received or determined about how each facet to which an element maps and provides a value is linked to a remaining part of the data corpus so that the defined facets can be related or linked to other facets in a facet query. A scheme or method for providing or determining the information in blocks 204, 206 and 208 constitutes a method for creating user defined facets or predefined facets that may be used with faceted queries as described herein to retrieve desired information. Once a user defined facet is created by having the information or data from blocks 204, 206 and 208, the user can participate in faceted queries. The method 200 allows a user to be able to define custom facets or user-defined facets that may point to portions of data in the relational database as metadata elements in the domain or application.

Figure 3:
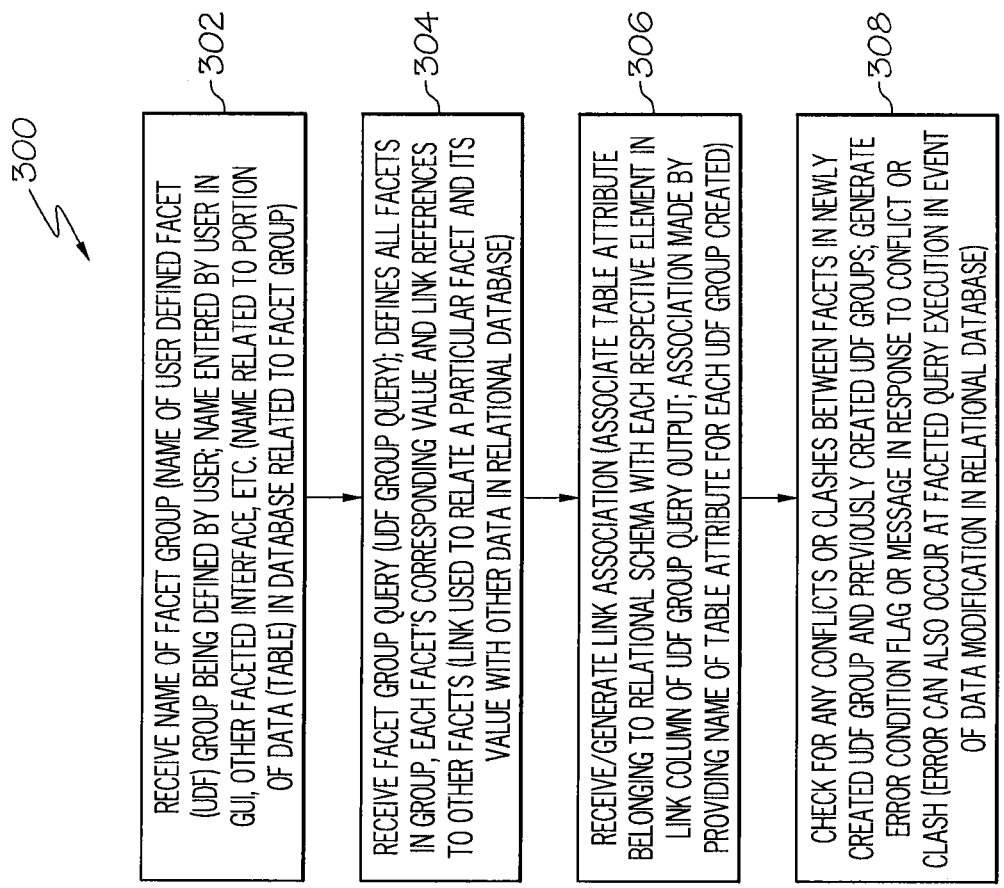
FIG. 3 is a flowchart of an example of a method to generate user defined facets or a faceted interface in accordance with another embodiment of the present invention.

FIG. 3 is a flowchart of an example of a method 300 to generate user defined facets or a faceted interface in accordance with another embodiment of the present invention. In block 302, a name of a facet group may be received or defined. The name of the user defined facet (UDF) group being defined may be entered into a GUI or other interface by a user. The facet group name may be related to or represent a portion of data, for example a particular table of data, in the relational database corresponding to the facet group being created or defined.

In block 304, a facet group query or UDF group query may be received or defined. The facet group query or UDF group query may define or list all facets in the UDF group. Each facet's corresponding value and link reference to other facets may be received or determined. A link or link reference may be used to relate a particular facet and its value with other data in the relational database.

In block 306, a link association may be received or generated. The link association may involve associating a table attribute belonging to the relational schema with each respective element in a LINK column, such as LINK column 506 in FIG. 5 of a UDF group query output 500. The association may be made by providing a name of a table attribute for each UDF group created.

Referring also to FIGS. 4 and 5, FIG. 4 is a relational database 400 for use in an example of the invention in accordance with an embodiment. FIG. 5 is an example of an output 500 of a user defined facet group query in accordance with an embodiment of the present invention. The output 500 of the user defined facet group query may be represented by a table 500 as illustrated in FIG. 5 including columns for defining each facet 502, the facet value 504 associated with each facet and the link 506 associated with each facet.

In an example using the relational database illustrated in FIG. 4, a name of the facet group that may be created in block 302 of FIG. 3 may be "PRODUCTATTRS" for product attributes. The UDF group query that may be created in block 304 for the example may be:

```
SELECT ATTRIBUTE.ATTRIBUTENAME AS FACET,
ATTRIBUTE_VALUE.VALUE AS VALUE,
PRODUCT_ATTRIBUTE.PID AS LINK FROM ATTRIBUTE,
ATTRIBUTE_VALUE, PRODUCT_ATTRIBUTE WHERE
ATTRIBUTE_VALUE.AID=ATTRIBUTE.AID AND
ATTRIBUTE.AID=PRODUCT_ATTRIBUTE.AID AND
ATTRIBUTE.TYPE=LIST
```

The link attribute name or association in block 306 for the example may be "PRODUCT.PID" which refers to the Product object table 404 and column or facet Product.PID 406.

FIG. 6 illustrates the results 600 of executing the user defined facet group query above applied to the relational database 400 of FIG. 4.

In block 308 of FIG. 3, any conflicts or clashes between facets in a newly created UDF group and any previously created UDF groups may be checked. An error condition flag or message may be generated in response to a conflict or clash between facets. An error can occur at faceted query execution in the event of data modifications in the relational database.

Figure 7:
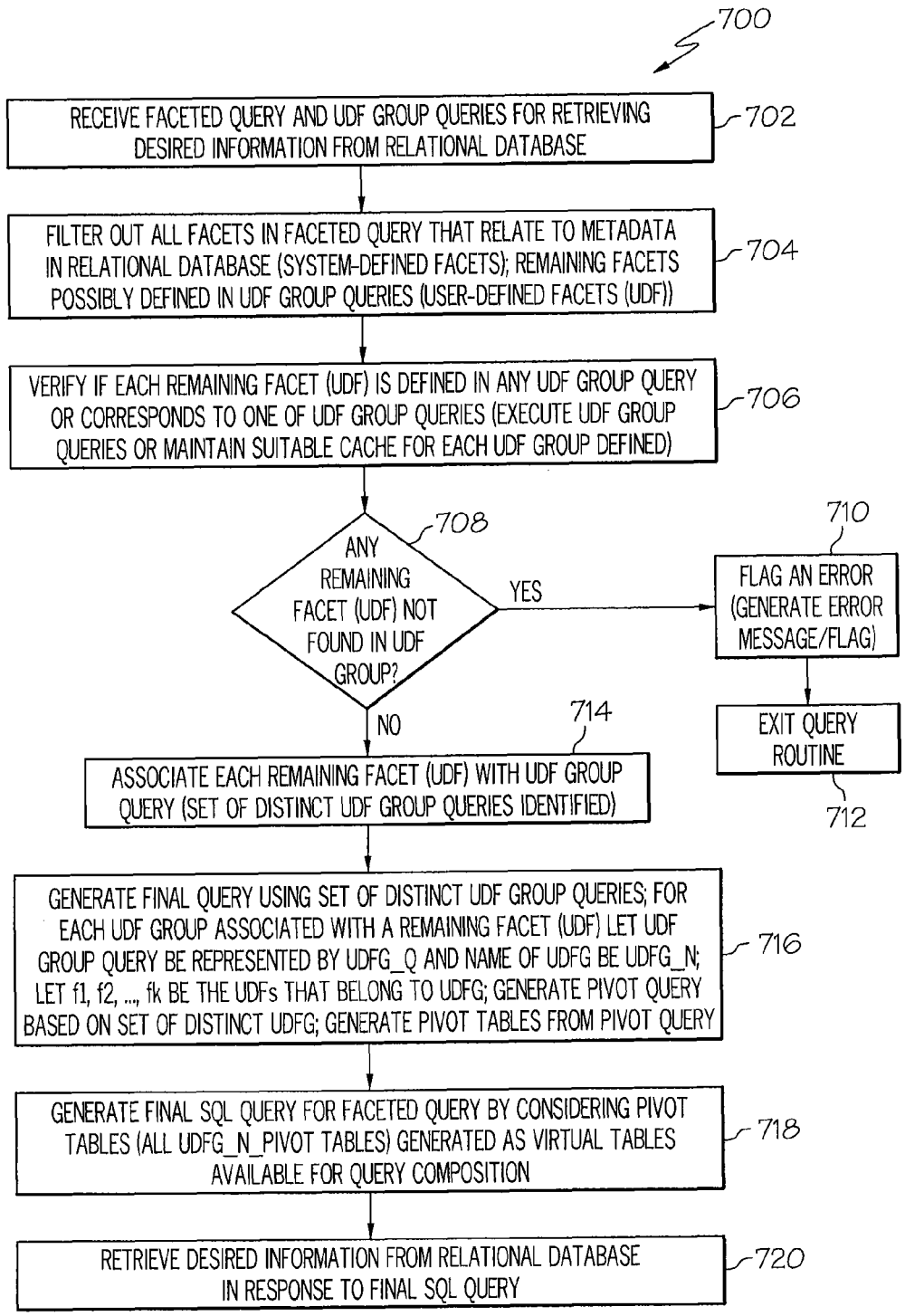
FIG. 7 is a flow chart of an example of a method for retrieving information from a relational database using user defined facets in a faceted query in accordance with an embodiment of the present invention.

FIG. 7 is a flow chart of an example of a method 700 for retrieving information from a relational database using user defined facets in a faceted query in accordance with an embodiment of the present invention. In block 702, a faceted query and at least one user defined facet (UDF) group query or a plurality of UDF group queries may be received for retrieving desired information from a relational database.

In block 704, facets in the faceted query that relate to metadata in the relational database may be filtered out. The facets filtered out may be referred to as system-defined facets. The facets remaining in the faceted query may possibly be defined in the UDF group queries. The remaining facets may be referred to as user defined facets (UDF).

In block 706, each remaining facet (UDF) may be verified as being defined in any UDF group query or being defined in or corresponding to one of the UDF group queries. The UDF group queries may be executed or a suitable cache for each UDF group defined may be maintained for purposes of verifying that each remaining UDF is defined by one of the UDF group queries.

In block 708, a determination may be made if any remaining facet (UDF) is not found in a UDF group query. If any remaining facet is not found as being defined or corresponding to one of the UDF group queries, the method 700 may advance to block 710. In block 710, an error may be flagged or an error message or flag may be generated and the query routine may be exited or terminated in block 712.

If each remaining facet in the faceted query is found or defined in the UDF group queries, the method 700 may advance to block 714. In block 714, each remaining facet or UDF may be associated with the corresponding UDF group query. A set of distinct UDF group queries may be identified by associating each remaining facet in the faceted query to its corresponding or defining UDF group query.

In block 716, a final SQL query may be generated using the set of distinct UDF queries. For each UDF group associated with a remaining facet (UDF) let the UDF group query be represented by UDFG_Q and name of the UDF group be UDFG_N. Let $f_1, f_2, \ldots, f_k$ be the UDFs that belong to each UDF group. A pivot query based on the set of distinct UDF groups may be generated as follows:

```
WITH UDFG_N AS (UDFG_Q),
UDFG_N_PIVOT AS (
SELECT TEMP₁.VALUE AS f₁, TEMP₂.VALUE AS f₂, ...,
TEMPₖ.VALUE AS fₖ, LINK FROM UDFG_N AS TEMP₁, UDFG_N
AS TEMP₂, ..., UDFG_N AS TEMPₖ WHERE TEMP₁.FACET=f₁ AND
TEMP₂.FACET=f₂ AND ... TEMPₖ.FACET=fₖ AND
TEMP₁.LINK=TEMP₂.LINK AND TEMP₂.LINK=TEMP₃.LINK AND
...TEMPₖ₋₁.LINK=TEMPₖ.LINK)
```

The ellipses in the query above indicate that items appropriately filled up by the iterations setup to generate the pivot query. Iterations happen through the facets obtained by letting $f_1, f_2, \ldots, f_k$ be the UDFs that belong to each UDF group. The pivot query may produce a group of pivot tables. Pivot is a known database operation which turns data found in rows of a database into column headings. The technique is commonly used in multi-dimensional database queries. Not all facets in a domain model may be available in a straight forward manner as column headings, for example database schema or metadata as referred to herein. Some facets may appear as data elements in some tables. The process of having user defined facets is to make such data elements appear as facets or column headings. Accordingly, the process described herein brings up, turns up or pivots the relevant data elements into column headings so that they can be used in regular SQL queries. The process described herein actually uses pivot queries analogous to pivot operations in multi-dimensional databases. In the exemplary pivot query defined above, data elements in a row are turned up or pivoted to make them appear as column headings in virtual pivot tables as described in the example.

For every user defined facet group, a virtual pivot table is constructed in which the data elements that were marked as facets by the user defined facet group query appear as column headings. Thus, the relevant data elements have been pivoted and made to appear as metadata.

Once all the virtual pivot tables for each user defined facet group have been constructed, the final SQL may be generated as though the virtual pivot tables were available in the database directly in the first place. Thus, the virtual pivot tables overcome the obstacle of facets in the data portions and not the metadata portions of a relational database and permit the use of universal relation methods to generate a final query.

In block 718, a final SQL query may be generated for the faceted query by considering the pivot tables (all UDFG_N pivot tables) generated as virtual tables available for query composition.

In block 720, the desired information may be retrieved from the relational database in response to the final SQL query and presented to the user or requester.

Continuing the example above with the user defined facet group PRODUCTATTRS UDFG as defined above, the following query may be considered as an example: "list names of all customer who have purchase anything that is black in color." The faceted query may then be "COLOR=BLACK/CUSTOMERNAME". Following the method 700, the method execution may be as follows:

System defined facets (block 704):
SDFs: {CUSTOMERNAME}
User defined facets (block 704):
UDFs: {COLOR}
Set of distinct user defined facet groups (UDFGs) (block 714):
UDFG SET: {PRODUCTATTRS}
Generated SQL query (block 716):

```
WITH PRODUCTATTRS AS (
  SELECT ATTRIBUTE.ATTRIBUTENAME AS FACET,
  ATTRIBUTE_VALUE.VALUE AS VALUE,
  PRODUCT_ATTRIBUTE.PID AS LINK FROM
  ATTRIBUTE, ATTRIBUTE_VALUE,
  PRODUCT_ATTRIBUTE
  WHERE ATTRIBUTE_VALUE.AID=ATTRIBUTE.AID
  AND ATTRIBUTE.AID=PRODUCT_ATTRIBUTE.AID
  AND
  ATTRIBUTE.TYPE=LIST ),
PRODUCTATTRS_PIVOT AS (
  SELECT TEMP1.VALUE AS COLOR, LINK FROM
  PRODUCTATTRS AS TEMP1
  WHERE TEMP1.FACET=COLOR )
SELECT CUSTOMER.CUSTOMERNAME FROM CUSTOMER,
PRODUCT, ORDERENTRY, PRODUCTATTRS_PIVOT WHERE
CUSTOMER.CID=ORDERENTRY.EID AND
ORDERENTRY.PID=PRODUCT.PID AND
```

-continued

```
PRODUCTATTRS_PIVOT.LINK=PRODUCT.PID AND
PRODUCTATTRS_PIVOT.COLOR=BLACK
```

Figure 8:
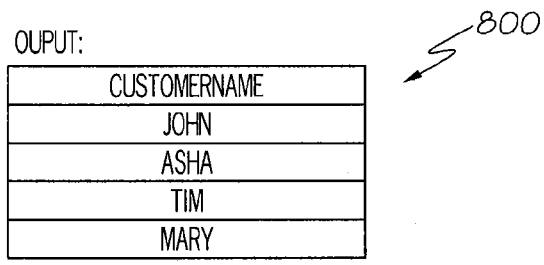
FIG. 8 includes the results of an example of retrieving information from the relational database in FIG. 4 using user defined facets in a faceted query in accordance with the exemplary method in FIG. 7.

The retrieved information responsive to the SQL query for the example is illustrated in table 800 of FIG. 8 which list the names of all customers who purchased a product that was black in color.

Figure 9A:
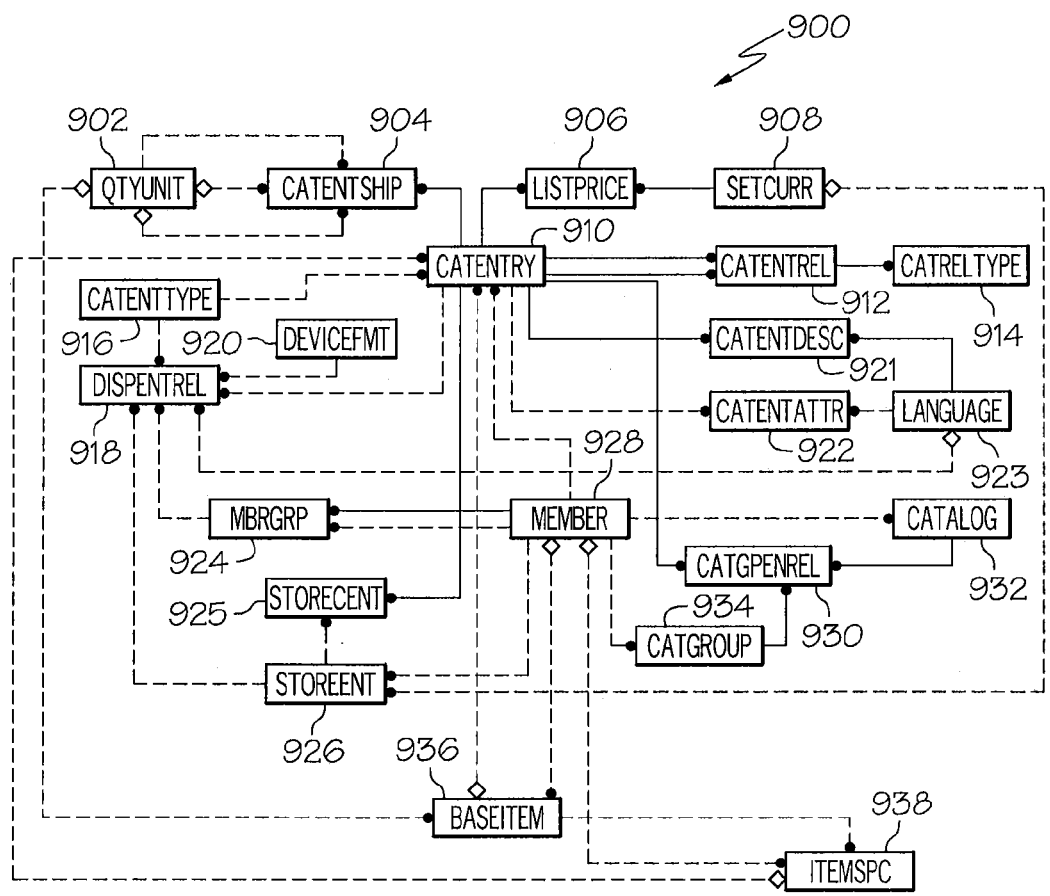

FIGS. 9A-9G illustrate an example of retrieving information from a relational database using user defined facets in a faceted query in accordance with an embodiment of the present invention. The method described with reference to FIGS. 9A-9G may be substantially the same as the method 700 in FIG. 7. FIG. 9A is an exemplary catalog entry data model 900 including a set of tables 902-938 which define the structure and attributes of catalog entries. The tables 902-938 include information such as descriptions of a catalog entry, relationship between catalog entries, price and other information that may be associated with an e-commerce enterprise or online store.

Figure 9B:
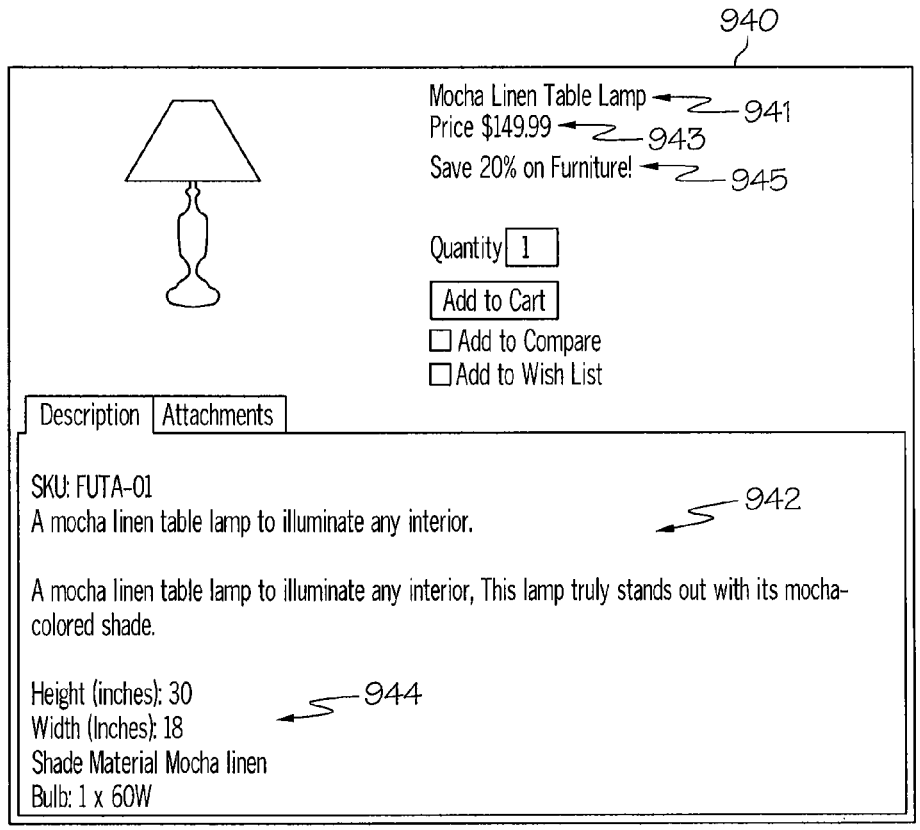

FIG. 9B is an example of a product details page 940 for an item or product that may be presented to a user on an e-commerce web site associated with the catalog entry data model 900. Data or information from a varied set of tables from tables 902-938 may be pulled together and displayed to the user on the product details page 940. For example, the product detail page 940 may display a product name 941, a product description 942, price 943, product attributes and features 944, product offers or promotions 945 or similar information. While the information such as description, name and price can be obtained from tables 902-938 belonging to the catalog entry data model 900, the attribute information may be stored in an attribute data model 946 such as that illustrated in FIG. 9C.

Figure 9C:
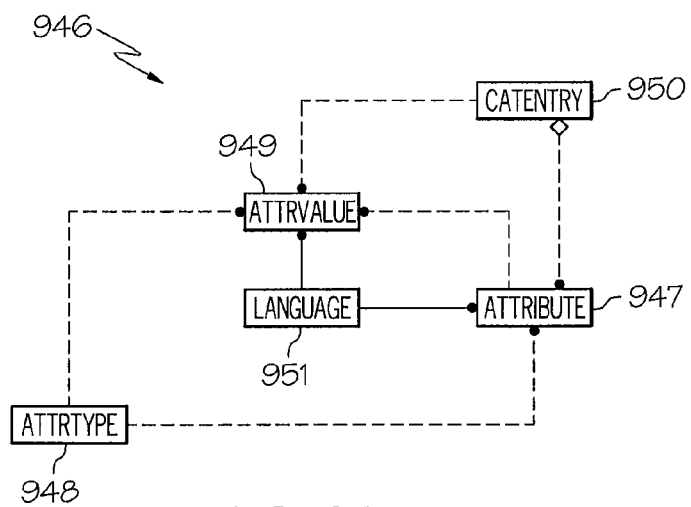

In the exemplary attribute data model 946 shown in FIG. 9C, the exemplary attribute data model 946 includes 5 tables. An attribute table (attribute) 947 to hold the attributes of all products. An attribute type table (attrtype) 948 to store information about the type of attribute. Some valid attribute types may be integer, string, float or similar attributes. An attribute value table (attrvalue) 949 to hold values assigned to product attributes. A catalog entry table (catentry) 950 to hold the information related to a catalog entry. Examples of catalog entries may include products, items, packages and bundles. A language table (language) 951 to store information in the various languages that may be supported by the e-commerce application or web site. The different attribute tables 947, 948, 949, 950 and 951 may include related data and may be linked together as illustrated in FIG. 9C. An example of the attribute table 947 including sample attribute data is illustrated in FIG. 9D. An example of the attribute value table 949 including sample data is illustrated in FIG. 9E.

As illustrated in these exemplary tables, the attributes of products are presented in the data rather than the schema of the e-commerce application or website. The attributes, such as height, width, etc. are all present in rows of the tables rather than in columns. Accordingly, user defined facets or pre-defined facets are needed to project the attributes of products as facets. As an example, user defined facets may be created to project product attributes as facets. A user defined facet (UDF) query may be created to project all attributes. For this example, the name of the facet group may be "PRODUCTAT-TRS". The UDF group query may be:

```
select a.Name as FACET,
case a.attrtype_id when 'INTEGER' then cast(v.integervalue as char(25))
else
case a.attrtype_id when 'STRING' then cast(v.stringvalue as char(25)) else
case a.attrtype_id when 'FLOAT' then cast(v.floatvalue as char(25)) else
NULL
end end end
as VALUE,
v.catentry_id as LINK
from db2admin.attribute as a, db2admin.attrvalue as v
where a.attribute_id=v.attribute_id and a.language_id=-1 and
v.language_id=-1 and
v.catentry_id=a.catentry_id;
```

The link attribute name for this example is "CATENTRY.CATENTRY_ID". A resulting table or UDF 952 from executing the UDF group query on the e-commerce sample data is illustrated in FIG. 9F.

After the UDF 952 has been defined, a faceted query that contains facets belonging to some of the UDF groups may be executed. With the UDF group "PRODUCTATTRS UDFG defined in table 952, the following exemplary faceted query may be performed:

Query: List names and ids of all items belonging to the 'Table Lamps' category and having Mocha Linen as the material of the table lamp shade.

The corresponding faceted query may be:

Faceted Query: SHADE MATERIAL=MOCHA
LINEN/CATEGORY = TABLE LAMPS/CATENTRY_ID/NAME Performing the method 700 described with reference to FIG. 7 the system defined facets (SDFs), user defined facets (USFs) and set of UDF group queries (UDFG SET) may be as follows:

SDFs: {CATENTRY_ID, NAME, Category = Table Lamps }
UDFs: {Shade Material = Mocha Linen}
UDFG SET: {PRODUCTATTRS}

The generated SQL query may be:

```
WITH PRODUCTATTRS AS (
  select a.Name as FACET,
    case a.attrtype_id when 'INTEGER' then cast(v.integervalue as
char(25)) else
    case a.attrtype_id when 'STRING' then cast(v.stringvalue as
char(25)) else
    case a.attrtype_id when 'FLOAT' then cast(v.floatvalue as
char(25)) else NULL
    end end end
    as VALUE,
    v.catentry_id as LINK
  from db2admin.attribute as a, db2admin attrvalue as v
  where a.attribute_id=v.attribute_id and a.language_id=-1 and
  v.language_id=-1 and
  v.catentry_id=a.catentry_id),
PRODUCTATTRS_PIVOT AS (
SELECT TEMP1.VALUE AS "Shade Material", LINK FROM
PRODUCTATTRS AS TEMP1 WHERE
TEMP1.FACET='Shade Material')
SELECT DISTINCT C.CATENTRY_ID, D.NAME FROM
PRODUCTATTRS_PIVOT, DB2ADMIN.CATENTRY AS C,
DB2ADMIN.CATGROUP AS G,
DB2ADMIN.CATENTDESC AS D WHERE G.IDENTIFIER='Table
Lamps' AND
```

-continued

```
D.CATENTRY_ID=C.CATENTRY_ID AND D.LANGUAGE_ID=-
1 and
PRODUCTATTRS_PIVOT.LINK=C.CATENTRY_ID AND
PRODUCTATTRS_PIVOT."Shade Material" = 'Mocha
linen';
```

The resulting information or table 954 from the SQL query to retrieve the desired information is illustrated in FIG. 9G.

In this fashion, even though domain metadata was modeled as data in the relational database, the facility of user defined facets is able to weave them as first class facets into the faceted query execution routine (based on Universal Relation Model techniques). This technique therefore makes faceted interfaces more applicable to realistic scenarios.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for retrieving information from a relational database, the method comprising:
   receiving, by the processing device, a faceted query comprising a plurality of facets;
   receiving, by the processing device, at least one user defined facet group query;
   filtering out, by the processing device, to remove facets from the faceted query that are system-defined facets, the system-defined facets relating to metadata in the relational database;
   associating, by the processing device, each remaining facet in the faceted query with a corresponding user defined facet group query of the at least one user defined facet group query to provide a set of user defined facet group queries;
   generating, by the processing device, a output from the set of user defined facet group queries applied to the relational database, the output comprising a results table consisting of three columns, a first column of the three columns being a facet column including a definition of a facet in each row of the results table, a second column of the three columns being a value associated with the facet in each row, and a third column of the three columns being a link column including a link associated with the facet in each row that relates the associated facet and its value to other data in the relational database;
   generating, by the processing device, an SQL query for the faceted query using the set of user defined facet group queries; and
   retrieving, by the processing device, the information from the relational database responsive to the SQL query.

2. The method of claim 1, further comprising generating a pivot query based on the set of user defined facet group queries including each remaining facet in the faceted query that is associated with the corresponding user defined facet group query of the at least one user defined facet group query.

3. The method of claim 2, further comprising:
   generating at least one pivot table from the pivot query; and
   generating the SQL query for the faceted query by considering the at least one pivot table as a virtual table for query composition.

4. The method of claim 1, further comprising:
   verifying that each remaining facet of the faceted query after filtering corresponds to the at least one user defined facet group query;
   flagging an error in response to any remaining facet of the faceted query not corresponding to the at least one user defined facet group query; and
   exiting a query routine in response to any remaining facet not corresponding to the at least one user defined facet group query.

5. The method of claim 1, further comprising generating a link association by associating a table attribute belonging to a relational schema of the relational database with a link column of a user defined facet group query output, wherein the association is made by receiving a name of the table attribute for each user defined facet group created.

6. The method of claim 1, further comprising:
   checking for any conflict between each facet of the at least one user defined facet group query and any facet or another user defined facet group query; and
   generating an error condition flag or message in response to any conflict.

7. The method of claim 1, further comprising providing a mechanism to define facets to point to portions of data in the relational database that are metadata elements in a domain data model.

8. The method of claim 7, further comprising:
   receiving information about which elements in the relational database map to a facet in the domain data model;
   receiving information about which elements in the relational database provide a value for each facet to which a corresponding element maps; and
   receiving information related to linking of each facet to which the corresponding element maps and provides the value to other facets in the at least one user defined facet group query.

9. A system for retrieving information from a relational database, the system comprising:
   a processing device;
   a faceted query engine operable on the processing device, wherein the faceted query engine comprises:
      a module for receiving a faceted query comprising a plurality of facets;
      a module for receiving at least one user defined facet group query;
      a module for filtering out to remove facets from the faceted query that are system-defined facets, the system-defined facets relating to metadata in the relational database;
      a module for associating each remaining facet in the faceted query with a corresponding user defined facet group query of the at least one user defined facet group query to provide a set of user defined facet group queries;
      a module for generating a output from the set of user defined facet group queries applied to the relational database, the output comprising a results table consisting of three columns, a first column of the three columns being a facet column including a definition of a facet in each row of the results table, a second column of the three columns being a value associated with the facet in each row, and a third column of the three columns being a link column including a link associated with the facet in each row that relates the associated facet and its value to other data in the relational database;
   a module for generating an SQL query for the faceted query using the set of user defined facet group queries; and
   a module for retrieving the information from the relational database responsive to the SQL query.

10. The system of claim 9, further comprising a module for generating a pivot query based on the set of user defined facet group queries including each remaining facet in the faceted query that is associated with the corresponding user defined facet group query of the at least one user defined facet group query.

11. The system of claim 10, further comprising:
   a module for generating at least one pivot table from the pivot query; and
   a module for generating the SQL query for the faceted query by considering the at least one pivot table as a virtual table for query composition.

12. A computer program product to retrieve information from a relational database, the computer program product comprising:
   a non-transitory computer readable storage medium having computer readable program code embodied therewith, the computer readable program code comprising:
   computer readable program code configured to receive a faceted query comprising a plurality of facets;
   computer readable program code configured to receive at least one user defined facet group query;
   computer readable program code configured to filter out to remove facets from the faceted query that are system-defined facets, the system-defined facets relating to metadata in the relational database;
   computer readable program code configured to associate each remaining facet in the faceted query with a corresponding user defined facet group query of the at least one user defined facet group query to provide a set of user defined facet group queries;
   computer readable program code configured to generate a output from the set of user defined facet group queries applied to the relational database, the output comprising a results table consisting of three columns, a first column of the three columns being a facet column including a definition of a facet in each row of the results table, a second column of the three columns being a value associated with the facet in each row, and a third column of the three columns being a link column including a link associated with the facet in each row that relates the associated facet and its value to other data in the relational database;
   computer readable program code configured to generate an SQL query for the faceted query using the set of user defined facet group queries; and
   computer readable program code configured to retrieve the information from the relational database responsive to the SQL query.

13. The computer program product of claim 12, wherein the computer readable program code further comprises computer readable program code configured to generate a pivot query based on the set of user defined facet group queries including each remaining facet in the faceted query that is associated with the corresponding user defined facet group query of the at least one user defined facet group query.

14. The computer program product of claim 13, wherein the computer readable program code further comprises:
   computer readable program code configured to generate at least one pivot table from the pivot query; and
   computer readable program code configured to generate the SQL query for the faceted query by considering the at least one pivot table as a virtual table for query composition.

* * * * *